United States Patent [19]
Jorgensen

[11] 3,905,786
[45] Sept. 16, 1975

[54] HUMIDIFIER FILTER
[75] Inventor: Gary D. Jorgensen, Appleton, Wis.
[73] Assignee: Albany International Corporation, Albany, N.Y.
[22] Filed: Aug. 29, 1974
[21] Appl. No.: 501,502

[52] U.S. Cl. .............. 55/230; 55/249; 55/527; 55/529; 261/91
[51] Int. Cl.² ............................. B01D 47/00
[58] Field of Search ............ 55/230, 244, 250, 249, 55/525, 522, 527, 529, 524, 248; 261/91; 119/15; 161/42, 159

[56] References Cited
UNITED STATES PATENTS

| | | | |
|---|---|---|---|
| 1,685,221 | 9/1928 | Bahnson | 55/230 |
| 1,952,269 | 3/1934 | Londquist | 55/230 |
| 3,188,007 | 6/1965 | Myklebust | 55/230 X |
| 3,343,520 | 9/1967 | Schwarz, Jr. | 55/529 X |
| 3,528,227 | 9/1970 | Lee et al. | 55/529 X |

Primary Examiner—Frank W. Lutter
Assistant Examiner—David Lacey
Attorney, Agent, or Firm—Kane, Dalsimer, Kane, Sullivan and Kurucz

[57] ABSTRACT

A one-piece integral filter formed of suspended polyester material is disclosed for use with a canister type humidifier. The filter is heat formed to define an annular portion having an inner edge and an outer edge. A circular apron extends downwardly from the outer edge to extend about the top of the humidifier. The inner portion and a partial dome extending from the inner edge of the annular portion seat on top of the humidifier so that the intake air to the humidifier must pass through the filter.

4 Claims, 3 Drawing Figures

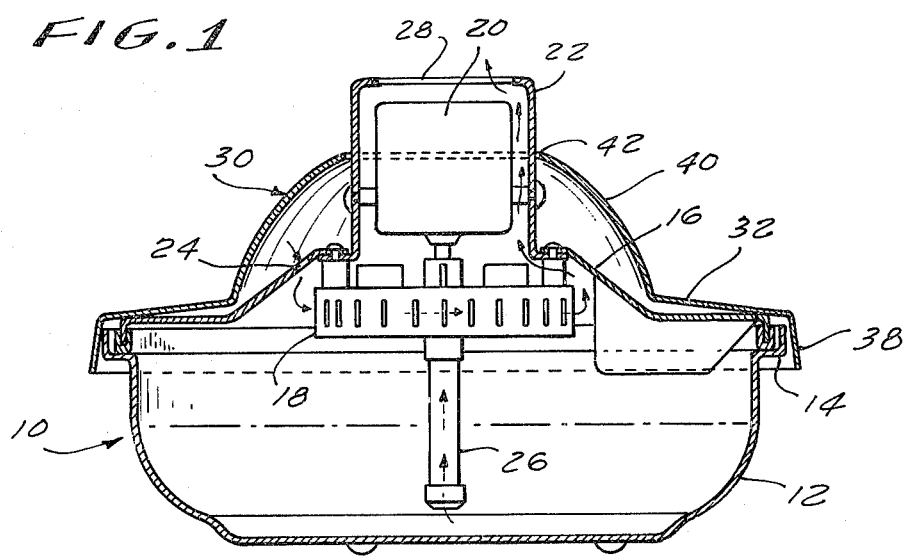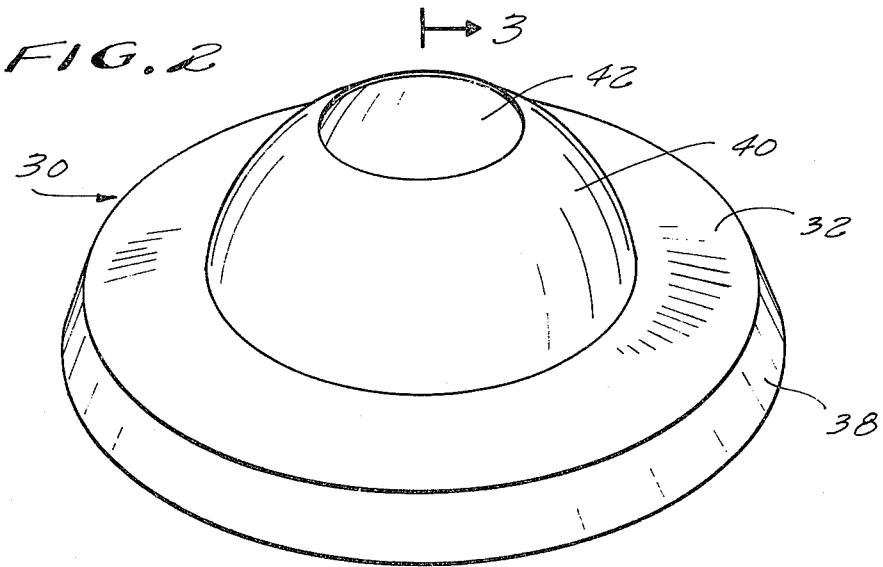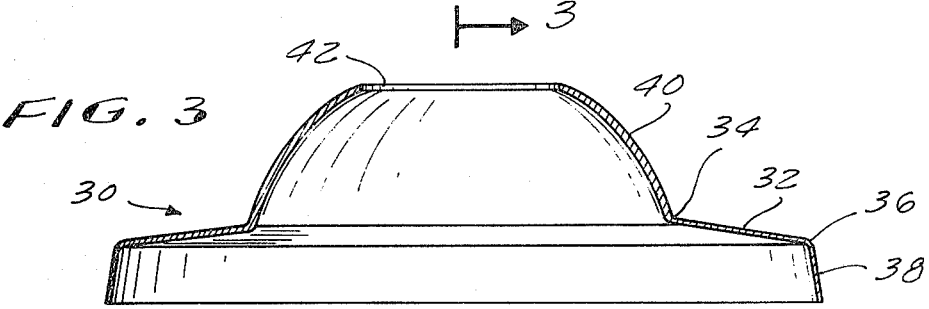

HUMIDIFIER FILTER

BACKGROUND OF THE INVENTION

The present invention relates to humidifiers and more particularly to a canister type humidifier provided with a filter adapted to filter the input.

Humidifiers are extensively used in homes, commercial establishments, medical and industrial facilities and the like to disperse minute particles of water into the air to develop an environment with a proper humidity. A common type of humidifier has an outer casing in the form of a cylindrical canister designed to emit water droplets from an outlet or outlets on its top surface. Portions of the casing top are more or less semi-spherical in shape to contain a rotor assembly which drives the moisture out of the unit. The rotor, in turn, is driven by a motor which extends beyond the casing top.

The humidifier may be constantly fed through a suitable connection to a water source or, more commonly, there may be included within its confines a reservoir to retain a quantity of water. As the humidifier operates, air is drawn into the unit and then expelled along with droplets of moisture.

In many installations where a controlled humidity must be provided, it is also essential that a bacteria-free environment also be provided. In this connection, the humidifier poses particular problems since airborne bacteria may be drawn into the humidifier and then expelled with the moisture droplets. Also, particularly in the case of the reservoir-type humidifier, bacteria may be bred within the humidifier itself. This latter problem is intensified by the buildup of airborne particles such as lint, dust and the like. In addition, these particles, when drawn into the unit may build up within the unit to eventually cause a drop in the efficiency of the device.

In view of the above, it is the principal object of the present invention to provide a simplified, readily disposable filter for a canister type humidifier adapted to remove lint, bacteriological and particulate matter from the air drawn into the humidifier.

A further objective is to provide such a filter which may readily and with a minimum of effort be replaced once the filter becomes spent.

SUMMARY OF THE INVENTION

The above and other beneficial objects and advantages are attained by providing an integral one-piece filter formed of a molded fibrous material such as Reemay material for use with a canister type humidifier. The filter is heat formed to define an annular portion having an inner edge and an outer edge. A circular apron extends downwardly from the outer edge to extend about the top of the humidifier. The inner portion and a partial dome extending from the inner edge of the annular portion seat on top of the humidifier so that all air drawn into the unit must pass through the filter.

BRIEF DESCRIPTION OF THE DRAWINGS

In the accompanying drawings:

FIG. 1 is a sectional side view of a canister type humidifier provided with a filter in accordance with the present invention;

FIG. 2 is a perspective view of a filter in accordance with the present invention; and, FIG. 3 is a sectional view taken along reference lines 3—3 of FIG. 2 in the direction indicated.

DETAILED DESCRIPTION OF THE PREFERRED EMBODIMENT

In FIG. 1, a humidifier 10 of the canister type is disclosed. Such a humidifier may, for example, be generally of the type shown in U.S. Pat. No. 3,130,245 which is typical of this type device. The humidifier includes a lower housing 12 defining a reservoir having an open top end 14 closed by an inverted bowl-shaped cover 16 defining a top portion of the humidifier. A rotor assembly 18 is supported from the center of the raised portion of cover 16. The rotor is driven by motor 20 supported in housing 22 which extends upwardly from the raised portion. The rotor serves to draw air into the humidifier through suitable openings 24 in the raised portion of the cover. It should be noted that this is a departure from the humidifier shown in the above referenced patent which shows air openings in the motor housing section of the cover. The rotor 18 also serves to draw up water from the reservoir through tube 26, atomize the water, and expel the water along with the air drawn in through an outlet 28.

In accordance with the present invention, a filter 30, depicted separately in FIGS. 2 and 3, is disposed over the humidifier top. Filter 30 is heat formed of a molded fibrous material such as suspended polyester material of the E. I. DuPont de Nemours and Company, Inc. of Wilmington, Delaware and sold under the trade name Reemay. Filter 30 comprises an annular portion 32 having an inner edge 34 and outer edge 36. A circular apron 38 extends downwardly and about the outer edge. A partial dome portion 40 extends inwardly and upwardly from the inner edge 32 as shown in the drawings. A central hole 42 is provided in the dome to accommodate the motor housing 22. Filter 30 is formed of rolled stock by sheeting it to dimension, heating it to make it molten, and then inserting the sheets in a die to produce the depicted configuration. As shown, in use, the filter 30 fits over the top portion of the humidifier with the motor housing 22 extending through opening 42. The diameter of apron 38 and opening 42 are such as to provide a light friction fit with the top of the humidifier and motor housing 22 respectively. In this manner, the filter is maintained in position during use.

In operation, air drawn into the humidifier must pass through filter 30 so that airborne bacteria and lint is prevented from entering the humidifier housing. When the filter becomes spent, it is merely discarded and replaced with another similar filter.

In the above manner, the aforementioned objects are effectively attained.

Having thus described the invention, what is claimed is:

1. In combination:
    1. a humidifier of the canister type, said humidifier having a generally round top portion, a droplet outlet extending through said top portion and an air inlet extending through said top portion and
    2. a one-piece integral filter formed of molded fibrous material disposed over said top portion covering said air inlet but not said droplet outlet.
2. The invention in accordance with claim 1 wherein said filter is heat formed to define an annular portion having an inner edge and an outer edge, a circular apron extending downwardly from said outer edge and a partial dome portion extending inwardly and upwardly from said inner edge, said apron being disposed about said humidifier top portion and said annular portion and partial dome portion being disposed over said top portion.

3. The invention in accordance with claim 2 wherein said humidifier includes a raised central portion and said filter partial dome portion includes a circular opening therein disposed about said raised portion.

4. A filter for use with a humidifier of the canister type having a generally round top portion containing therein a droplet outlet, said filter being heat formed of molded fibrous material to define an annular portion having an inner edge and an outer edge, a circular apron extending downwardly from said outer edge and a partial dome portion extending inwardly and upwardly from said inner edge, said dome portion also having a circular opening therein, said apron being adapted to be disposed about said humidifier top portion and said annular portion and partial dome portion being adapted to be disposed over said top portion to cover said air inlet but not said droplet outlet.

\* \* \* \* \*